(12) United States Patent
Ahn et al.

(10) Patent No.: US 8,055,086 B2
(45) Date of Patent: Nov. 8, 2011

(54) METHOD AND APPARATUS FOR EFFICIENTLY STORING STEREO IMAGE

(75) Inventors: Sang-Jun Ahn, Seoul (KR); Gun-Ill Lee, Seoul (KR)

(73) Assignee: Samsung Electronics Co., Ltd (KR)

( * ) Notice: Subject to any disclaimer, the term of this patent is extended or adjusted under 35 U.S.C. 154(b) by 881 days.

(21) Appl. No.: 12/100,624

(22) Filed: Apr. 10, 2008

(65) Prior Publication Data

US 2008/0260293 A1    Oct. 23, 2008

(30) Foreign Application Priority Data

Apr. 10, 2007  (KR) .................. 10-2007-0035161

(51) Int. Cl.
*G06K 9/36* (2006.01)
(52) U.S. Cl. .................. 382/232; 382/239; 382/305
(58) Field of Classification Search .......... 382/232, 382/239, 251, 104, 154, 302, 303, 305; 348/207.99; 358/1.9; 375/E7.226; 345/515, 619; 33/20.4; 600/111; 709/228, 227

See application file for complete search history.

(56) References Cited

U.S. PATENT DOCUMENTS 5,860,912 A * 1/1999 Chiba .......................... 600/111
7,899,915 B2 * 3/2011 Reisman ....................... 709/228

FOREIGN PATENT DOCUMENTS

| JP | 06-086270 | 3/1994 |
| JP | 2004-120176 | 4/2004 |
| KR | 1020050053703 | 6/2005 |

* cited by examiner

*Primary Examiner* — Anh Hong Do
(74) *Attorney, Agent, or Firm* — The Farrell Law Firm, P.C.

(57) ABSTRACT

Disclosed is a method for storing a stereo image. One file is created by using a JPEG File Interchange Format (JFIF) file structure used for storing a Joint Photographic Experts Group (JPEG) format image and a stereo image can be more simply and efficiently stored and compressed.

13 Claims, 10 Drawing Sheets

| NAME | SIZE | DESCRIPTION |
|---|---|---|
| SOI marker | 2 | FF D8 ALL THE TIME |
| APP0 marker | 2 | FF E0 ALL THE TIME |
| Data length | 2 | LENGTH INCLUDING DATA LENGTH FIELD |
| Identifier | 5 | INDICATING JFIF 4A 46 49 46 00 (ALL THE TIME) |
| Major version ID | 1 | VERSION NUMBER |
| Minor version ID | 1 | VERSION NUMBER |
| Units | 1 | INDICATING UNIT OF FOLLOWING X,Y RESOLUTION<br>0 – RESOLUTION IS NOT USED<br>1 – PIXELS PER INCH<br>2 – PIXELS PER Cm |
| Xdensity | 2 | HORIZONTAL RESOLUTION |
| Ydensity | 2 | VERTICAL RESOLUTION |
| Xthumbnail | 1 | WIDTH OF PREVIEW IMAGE. 0 IF NO PREVIEW IMAGE |
| Ythumbnail | 1 | HEIGHT OF PREVIEW IMAGE. 0 IF NO PREVIEW IMAGE |
| Thumbnail | VARIABLE | PREVIEW IMAGE, STORE PIXEL DATA IN RGB COLOR ORDER |

| NAME | SIZE | DESCRIPTION |
|---|---|---|
| APP0 marker | 2 | FF E0 ALL THE TIME |
| Data length | 2 | ADDITIONAL DATA LENGTH |
| Identifier | 7 | S,T,E,R,E,O,0  0x53, 0x54, 0x45, 0x52, 0x45, 0x4F, 0x00 |

| NAME | SIZE | DESCRIPTION |
|---|---|---|
| APP0 marker | 2 | FF E0 ALL THE TIME |
| Data length | 2 | ADDITIONAL DATA LENGTH |
| Identifier | 7 | S,T,E,R,E,O,0  0x53, 0x54, 0x45, 0x52, 0x45, 0x4F, 0x00 |
| additional data | variable | |

91 ~ (additional data)

METHOD AND APPARATUS FOR EFFICIENTLY STORING STEREO IMAGE

PRIORITY

This application claims priority under 35 U.S.C. §119 to application entitled "Method And Apparatus For Efficiently Storing Stereo Image" filed in the Korean Intellectual Property Office on Apr. 10, 2007 and assigned Serial No. 2007-35161, the contents of which are incorporated herein by reference.

BACKGROUND OF THE INVENTION

1. Field of the Invention

The present invention relates generally to a method and an apparatus for storing a stereo image, and in particular, to a file format structure suitable for storage of a stereo image and a method of storing the stereo image by using the same.

2. Description of the Related Art

With the wide spread popularity of camera phones, functions of camera phones have been increased and a camera phone capable of photographing a stereoscopic image as well as a two-dimensional image has appeared. A camera phone photographs a three-dimensional stereoscopic image, that is a stereo image, by using two camera sensors. A stereo image is compressed and stored by using conventional Codecs, such as conventional MPEG series, JPEG, H.26X series and file formats, such as MP4 and AVI. However, since there is no special file format for a stereo image in a conventional mobile communication terminal, it is impossible to transfer additional information representing a stereo image.

In a mobile communication terminal mounted with a barrier LCD, it is possible to display a three-dimensional stereoscopic image as well as a conventional two-dimensional image. Such a mobile communication terminal can realize not only a conventional two-dimensional image, but also a stereo image just as an actual image of a three-dimensional object viewed by the two eyes of a person. Specifically, a stereo image is a three-dimensional stereoscopic image created by using a left-viewpoint image and a right-viewpoint image, in which the left and the right images attached with each other are stored as one. Then, when the left image and the right image are displayed on a mobile communication terminal mounted with a barrier LCD through an interleaving process, a user can view a three-dimensional stereoscopic image.

In this manner, such a mobile communication terminal mounted with a barrier LCD can store a stereo image as well as a two-dimensional image, but a problem occurs in lower compatibility when a stereo image is stored using a process for storing a two-dimensional image.

As described above, since there has been no file format specifically defined for storing a stereo image, a stereo image has been stored using a conventional file structure without considering the characteristics of the stereo image. Therefore, although a mobile communication terminal mounted with a barrier LCD can display a stereo image as well as a two-dimensional image, it has been impossible to divide the two images and to display the two images according to image characteristics because both images are stored as a same file structure.

SUMMARY OF THE INVENTION

Accordingly, the present invention provides a method and an apparatus for efficiently storing a stereo image. In particular, the present invention provides a method and an apparatus for storing a stereo image, which can efficiently provide additional information on only a stereo image, while maintaining lower compatibility with the use of a structure of a Joint Photographic Experts Group (JPEG) file format.

In accordance with an aspect of the present invention, there is provided an apparatus for efficiently storing a stereo image, the apparatus including an image output unit for outputting a first image and a second image of one subject photographed at left and right positions spaced apart from each other by a predetermined distance; a JPEG File Interchange Format (JFIF) structure creator for inserting the first image from among the first and second images in an image area from among multiple areas included in a JFIF file, and inserting the second image in an additional APP (APPlication) Marker area from among the multiple areas, thereby creating a JFIF file; and a storing unit for storing the created JFIF file.

In accordance with another aspect of the present invention, there is provided a method of efficiently storing a stereo image, the method including the steps of: outputting a first image and a second image of one subject photographed at left and right positions spaced apart from each other by a predetermined distance; inserting the first image from among the first and second images in an image area from among multiple areas included in a JFIF file, and inserting the second image in a thumbnail area from among the multiple areas, thereby creating a JFIF file; and storing the created JFIF file.

BRIEF DESCRIPTION OF THE DRAWINGS

The above and other objects, features, aspects, and advantages of the present invention will become more apparent from the following detailed description when taken in conjunction with the accompanying drawings, in which.

DETAILED DESCRIPTION OF THE PREFERRED EMBODIMENTS

Hereinafter, preferred embodiments of the present invention will be described in detail with reference to the accompanying drawings. In the following description of the present invention, a detailed description of known functions and configurations incorporated herein is omitted to avoid making the subject matter of the present invention unclear.

In a method of storing a stereo image according to the present invention, a JPEG File Interchange Format (JFIF) file structure, which is used for storing a Joint Photographic Experts Group (JPEG) format image, is used to create one file, so that a stereo image can be more simply and efficiently stored and compressed.

Figure 1:
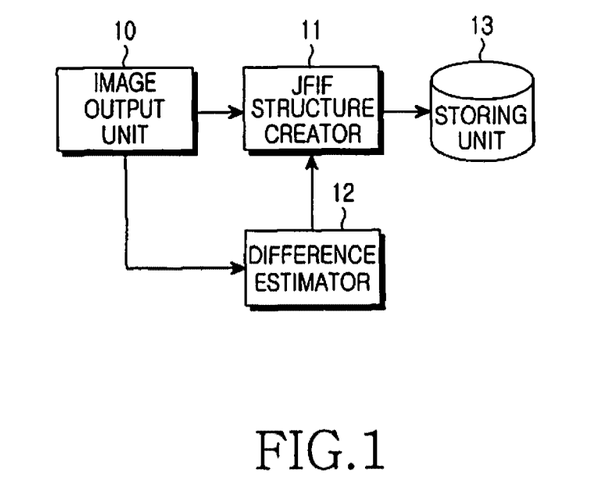
FIG. 1 is a block diagram illustrating an apparatus for storing a stereo image according to the present invention.

An apparatus for storing a stereo image, in which the functions as described above are implemented, will be described with reference to FIG. 1. Referring to FIG. 1, an apparatus for storing a stereo image according to the present invention includes an image output unit 10, a JFIF structure creator 11, a difference estimator 12 and a storing unit 13.

The image output unit 10 is provided with a stereo camera, and creates a left image and a right image of a subject using the stereo camera. Specifically, the image output unit 10 outputs left and right images of one subject photographed at left and right positions spaced apart from each other by a predetermined distance. Herein, since the image output unit 10 is mounted to a handheld apparatus, a predetermined distance of left and right positions means a position difference between camera sensors photographing a subject. Even when a front subject is photographed, differences occur in respective left and right images of the subject displayed on a screen in proportion to a distance between the image output unit 10 and the subject.

An embodiment of the present invention provides a method of inserting such left and right images in a JFIF structure. Herein, one image, that is, a main image, is inserted at the same position as a conventional two-dimensional image, and the other image is inserted at a position of a conventional thumbnail image instead of the thumbnail image. Another embodiment of the present invention provides a method of inserting only difference information between a main image and the other image in a JFIF structure, considering one image from among left and right images as the main image.

However, the methods according to the two embodiments described above are based on the fact that left and right images are formed from a common subject photographed at different positions. That is the two images are formed from different positions but have the same contents. Therefore, even when any one of the images is used as a thumbnail image of the other image, there is no difficulty in representing the relevant image.

When one main image and difference information are used to store a stereo image, an apparatus for storing a stereo image according to another embodiment of the present invention further includes the difference estimator 12. Such a difference estimator 12 is used to measure a difference between a left image and a right image, which are simultaneously input.

Figure 4:
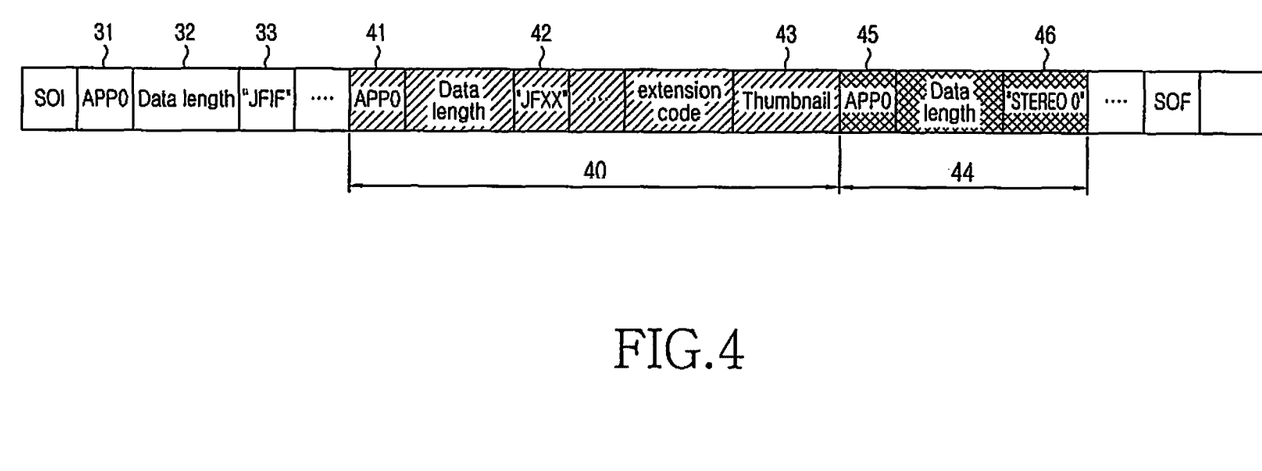
FIG. 4 is a diagram illustrating a JFIF structure according to a first embodiment of the present invention.

The JFIF structure creator 11 inserts an image photographed with the use of a conventional JPEG file format, together with information on where and how the image is inserted, in a JFIF structure, thereby creating a JFIF file. Specifically, the JFIF structure creator 11 inserts a first image in an image area of a JFIF file structure, and a second image in a thumbnail area, thereby creating a JFIF file. When difference information is transferred from the difference estimator 12 according to another embodiment of the present invention, the difference information is inserted in an additional APP (APPlication) Marker area of a JFIF file structure as shown in FIG. 4. Such a JFIF file is stored in the storing unit 13.

Figure 2:
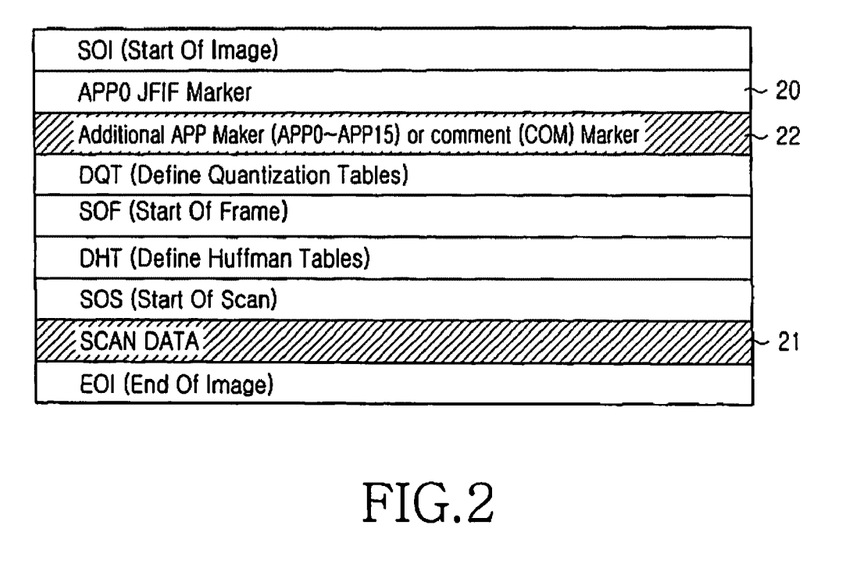
FIG. 2 is a diagram illustrating a structure of a JPEG File Interchange Format (JFIF) file used in the present invention.

Hereinafter, a JFIF, that is, a JPEG file structure used in the present invention, will be described in detail. FIG. 2 is a diagram illustrating a structure of a JFIF file used in the present invention, and the structure includes a plurality of blocks, in which each block is identified by a 2-byte unit marker preceded by "0xFF". Some data blocks end with a marker, and other data blocks end with additional data following a marker. When additional data is attached, a 2-byte data length follows a marker, and then the additional data follows it.

Start Of Image (SOI) indicates the start of an image, that is, the start of a JFIF file, and End Of Image (EOI) indicates the end of an image that is the end of a JFIF file.

An APPlication 0 (APP0) JFIF Marker 20 is a data block related to image attribute information, and stores information on image resolution, existence and nonexistence of a thumbnail image, etc. The APP0 JFIF Marker 20 is a data block inserted in a JFIF file structure.

An additional APP Marker (APP0~APP15) 22 is an area where other application data is additionally stored. The additional APP Marker area 22 is a data block directly related to a stereo-image storing function according to the present invention, and includes a thumbnail area used to store the other image other than a main image. After a main image is stored in a SCAN DATA area 21, the other image, that is a thumbnail image, is stored in the thumbnail area of the additional APP Marker area 22, in which the thumbnail image is resized through sub-sampling or is not resized. The other image other than a main image is called a thumbnail image. Also, according to another embodiment of the present invention, the additional APP Marker area 22 includes an area used to store difference information instead of a main image.

Define Quantization Tables (DQT) and Define Huffman Tables (DHT) are areas storing quantization and Huffman tables used in a compression process for encoding data. Start Of Frame (SOF) indicates the start of a frame, Start Of Scan (SOS) indicates the start of actual image data, and End Of Image (EOI) indicates the end of an image.

The SCAN DATA area 21 is an area where actual image data is stored, and one main image from among left and right images is stored in the present invention.

According to a first embodiment of the present invention as described above, the additional APP Marker area 22 and the SCAN DATA area 21 are used to insert left and right images. According to another embodiment of the present invention, difference information is inserted in the additional APP Marker area 22, and one main image is inserted in the SCAN DATA area 21. Such a JFIF file structure is created under the control of the JFIF structure creator 11.

Figure 3:
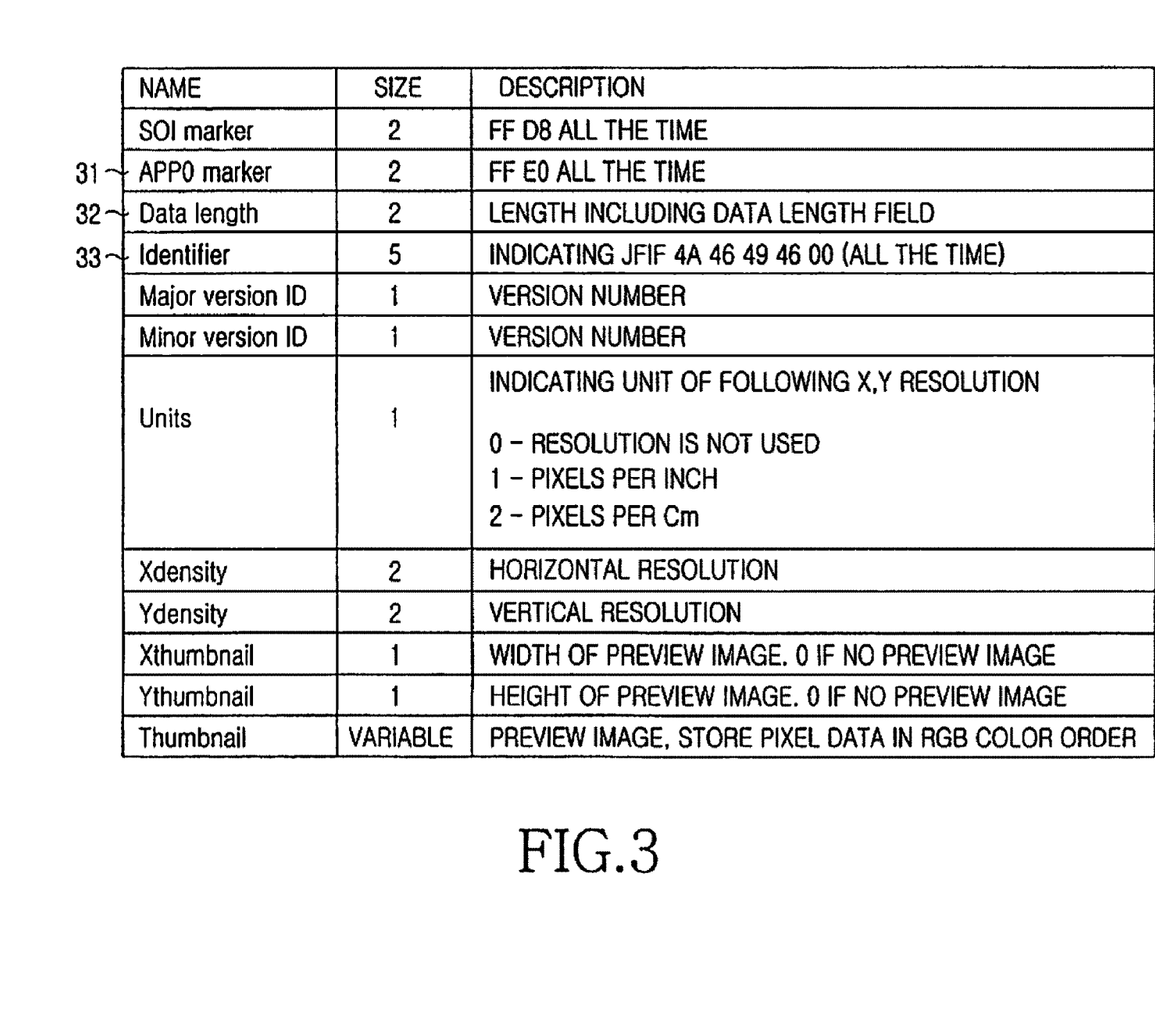
FIG. 3 is a data block diagram schematically illustrating a file structure of an APP0 JFIF Marker used in the present invention.

FIG. 3 is a data block diagram schematically illustrating a file structure of an APP0 JFIF Marker used in the present invention. An APP0 marker area 31 identifies an APP0 data block, and a Data length area 32 indicates the entire length of a data block including the Data length area. An Identifier area 33 is an identifier indicating a JFIF format in a JFIF standard, and is basically inserted in a JFIF file structure. Such an Identifier area 33 precedes an area indicating image resolution, existence and nonexistence of a thumbnail image, etc.

A structure of a JFIF according to the present invention is shown in FIG. 4. FIG. 4 is a diagram illustrating a JFIF structure according to a first embodiment of the present invention. FIG. 4 illustrates an inserted APP0 JFIF Marker area (see FIG. 3), that is, a "JFIF" data block, to which additional APP Marker areas 40 and 44 (data blocks) are added.

Referring to FIG. 4, the added data blocks in the present invention are identified by APP0 Markers 41 and 45. A first added data block 40 includes an identifier named "JFXX" set in an identifier area 42. The data block is a JFXX marker area, and is defined as a thumbnail area in a JFIF format. APP0 identifiers defined for a JFIF standard include JFIF and JFXX, and a data block having a JFXX identifier is used to store a thumbnail image. Also, according to another embodiment of the present invention, a data block having a JFXX identifier is used to store information on image data, such as difference information.

A thumbnail area 43 is an area where the other image other than a main image is inserted as a thumbnail image with and without a size adjustment. The image inserted in the thumbnail area 43 is stored after JPEG encoding. If a two-dimensional image is stored, a thumbnail image of the two-dimensional image is inserted in the thumbnail area 43.

Figure 5:
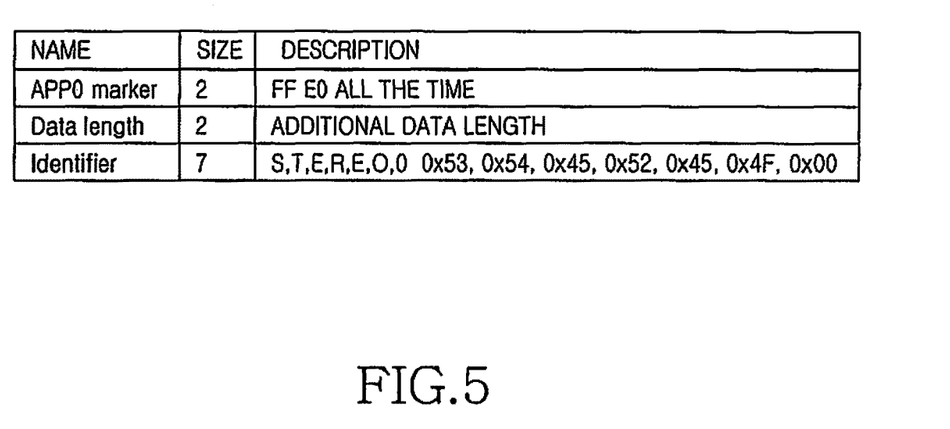
FIG. 5 is a diagram illustrating a STEREO marker structure according to a first embodiment of the present invention.

A second added data block 44 includes information for determining to display the stored image as a two-dimensional image or a stereo image. Accordingly, an area, which is used in order to identify a stereo image to be displayed in decoding, is additionally inserted in an additional APP Marker area of a JFIF file structure. For example, referring to FIG. 4, an identifier area 46 named "STEREO 0" is added, and a structure of the identifier area 46 is defined as shown in the diagram of FIG. 5. The existence and nonexistence of the "STEREO" area 46 is checked in decoding, and accordingly a two-dimensional image or a stereo image can be identified and displayed.

Figure 6:
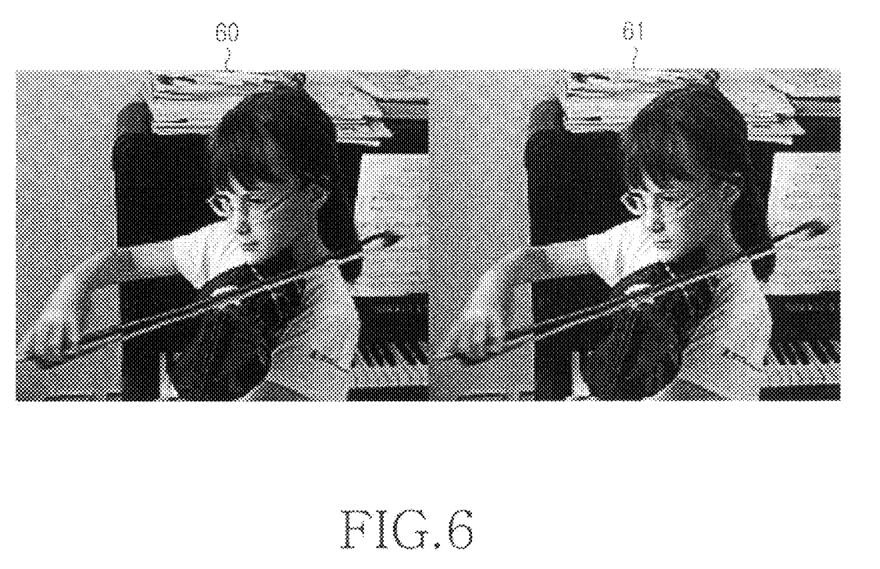
FIG. 6 illustrates left and right images with the same size according to a first embodiment of the present invention.
Figure 7:
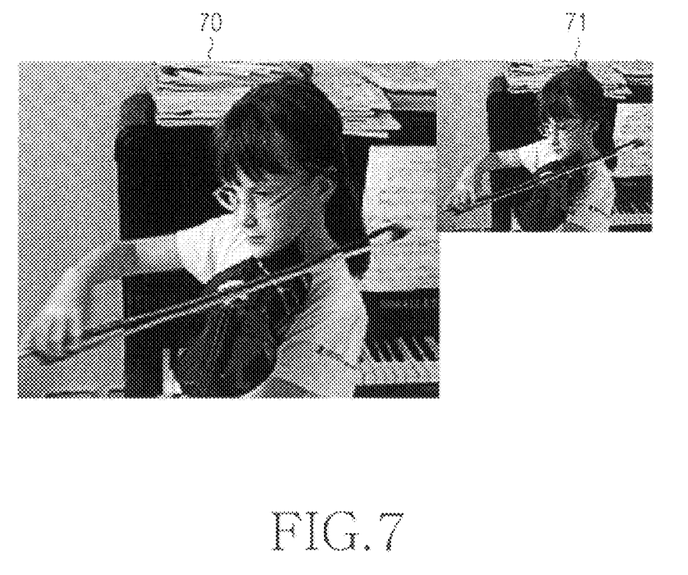
FIG. 7 illustrates a left image and a resized right image according to the present invention.

For example, when storing a stereo image, a left image as a main image is stored in a scan data area, and then a right image is also stored. FIG. 6 illustrates left and right images with the same size according to a first embodiment of the present invention. When storing a stereo image including a left image 60 and a right image 61, the right image 61 can be inserted in the thumbnail area 43 without a size adjustment. FIG. 7 illustrates a left image and a resized right image according to an embodiment of the present invention. A right image 71 resized differently from a left image 70 can be inserted in the thumbnail area 43.

For storing a right image, the present invention provides an added data block structure as shown in FIG. 4. Accordingly, when "JFXX" is set in an identifier area, a process of detecting a thumbnail image is performed in image decoding. In case of an application without using a thumbnail image, a data length following an APP0 Marker is used to skip the APP0 Marker data and actual image data in a scan data area following a SOF area is used to decode a JPEG image.

A thumbnail image is a miniaturized main image, such as an image used for a preview. In the present invention, an original and miniature of the other image other than a main image is inserted in the thumbnail area 43 by considering that two images included in a stereo image are formed from different positions but have the same contents. When decoding a resized image inserted in the thumbnail area 43, the resized image can be restored to the original size with reference to thumbnail-image size information, such as, width and height as shown in FIG. 3.

Figure 8:
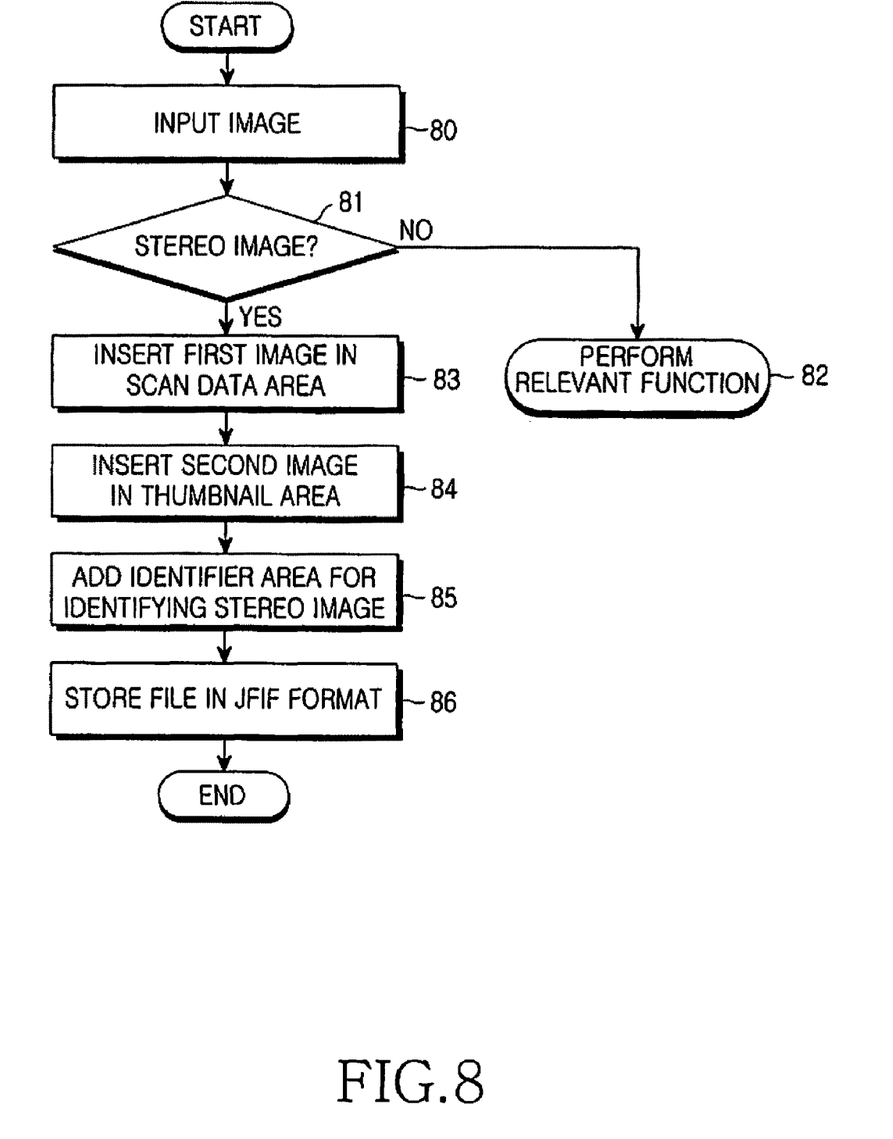
FIG. 8 is a control flowchart for storing a stereo image according to a first embodiment of the present invention.

Hereinafter, a process of creating a JFIF structure according to the present invention will be described with reference to FIG. 8. FIG. 8 is a control flowchart for storing a stereo image according to a first embodiment of the present invention. Referring to FIG. 8, when an image is input at step 80, an apparatus for storing a stereo image determines whether the input image is a stereo image or not at step 81. When the input image is not a stereo image, the apparatus proceeds to step 82 and performs the relevant function. That is, at step 82, the apparatus performs the same process as a process for storing a two-dimensional image. When the input image is a stereo image, the apparatus proceeds to step 83 and inserts a first image in a scan data area and then inserts a second image in a thumbnail area at step 84. The second image inserted in the thumbnail area may be an original image or a resized image. Then, the apparatus for storing a stereo image adds an identification area for identifying a stereo image at step 85, and stores a file in a JFIF format at step 86.

The stored JFIF file is displayed on a screen through the following steps. Specifically, in analyzing a JFIF file, a decoder identifies that an image to be displayed is a two-dimensional image or a stereo image by checking the existence and nonexistence of an identifier area named "STEREO 0" in a JFIF file structure. When the image is a stereo image, the decoder obtains one image from a scan data area, and the other image from a thumbnail area. When left and right images obtained in this manner are displayed on a mobile communication terminal mounted with a barrier LCD, a user can view a three-dimensional stereoscopic image.

Figure 9:
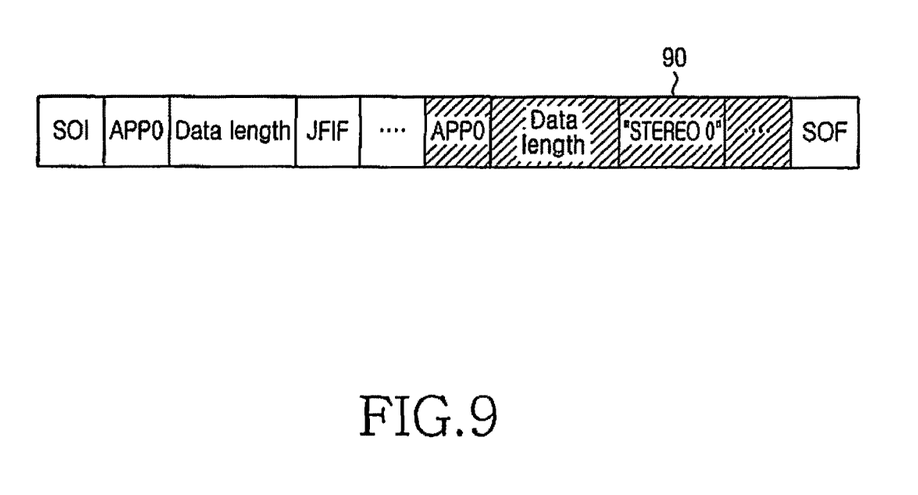
FIG. 9 is a diagram illustrating a JFIF structure according to another embodiment of the present invention.

Hereinafter, a method of storing only one main image and difference information according to another embodiment of the present invention will be described. In the method, difference information is inserted by defining a new identifier area. Accordingly, a data block named "STEREO 0" is additionally defined and inserted to an inserted "JFIF" data block as shown in FIG. 9. FIG. 9 is a diagram illustrating a JFIF structure according to another embodiment of the present invention.

Figure 10:
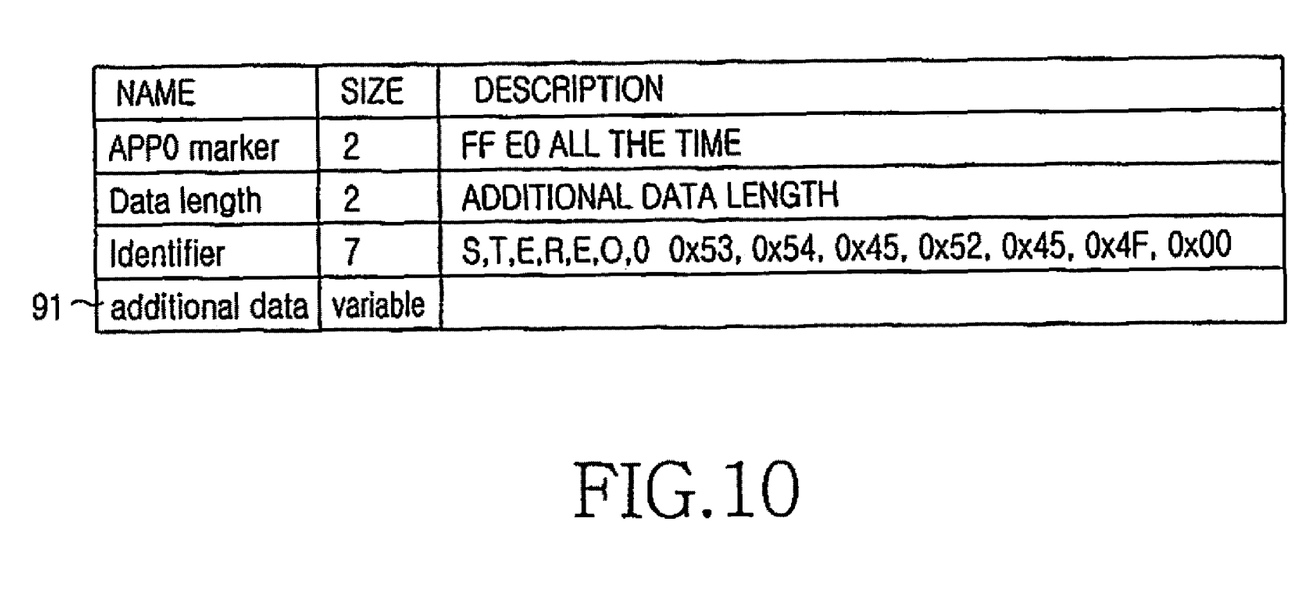
FIG. 10 is a diagram illustrating a STEREO marker structure according to another embodiment of the present invention.
Figure 11:
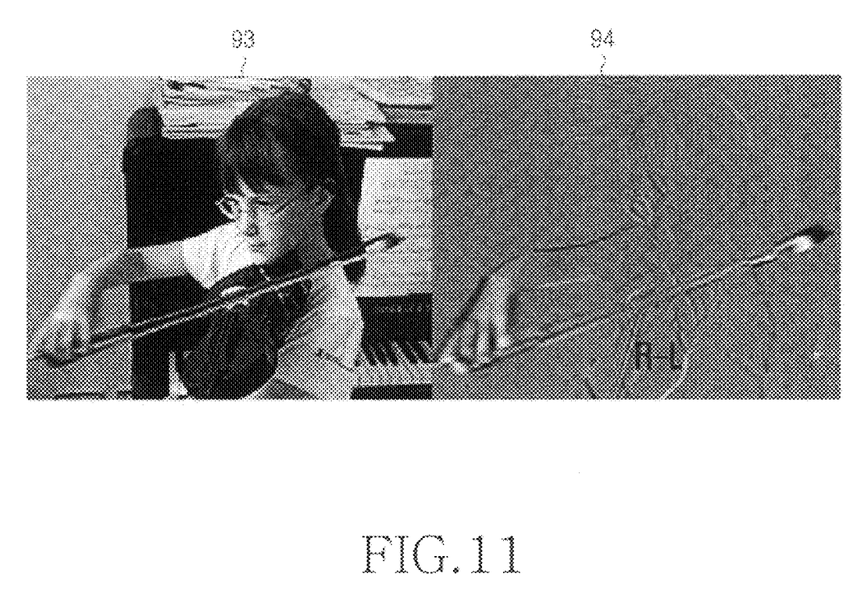
FIG. 11 illustrates a left image and difference of information between left and right images according to another embodiment of the present invention.

In the JFIF structure as shown in FIG. 9, an identifier area 90 named "STEREO 0" is added, and a structure of the identifier area 90 is defined in FIG. 10. FIG. 10 is a diagram illustrating a STEREO marker structure according to another embodiment of the present invention. Difference information is inserted in an additional data area 91, and specifically, data of a right image 94 as shown in FIG. 11 is inserted. A left image 93 of FIG. 11 is inserted in a scan data area and difference information 94 between left and right images is inserted in the additional data area 91. Since the newly defined identifier area named "STEREO 0" is not allocated for a thumbnail, it is possible to obtain JPEG-encoded information with only a difference between left and right images as shown in FIG. 11, besides sub-sampling.

Figure 12:
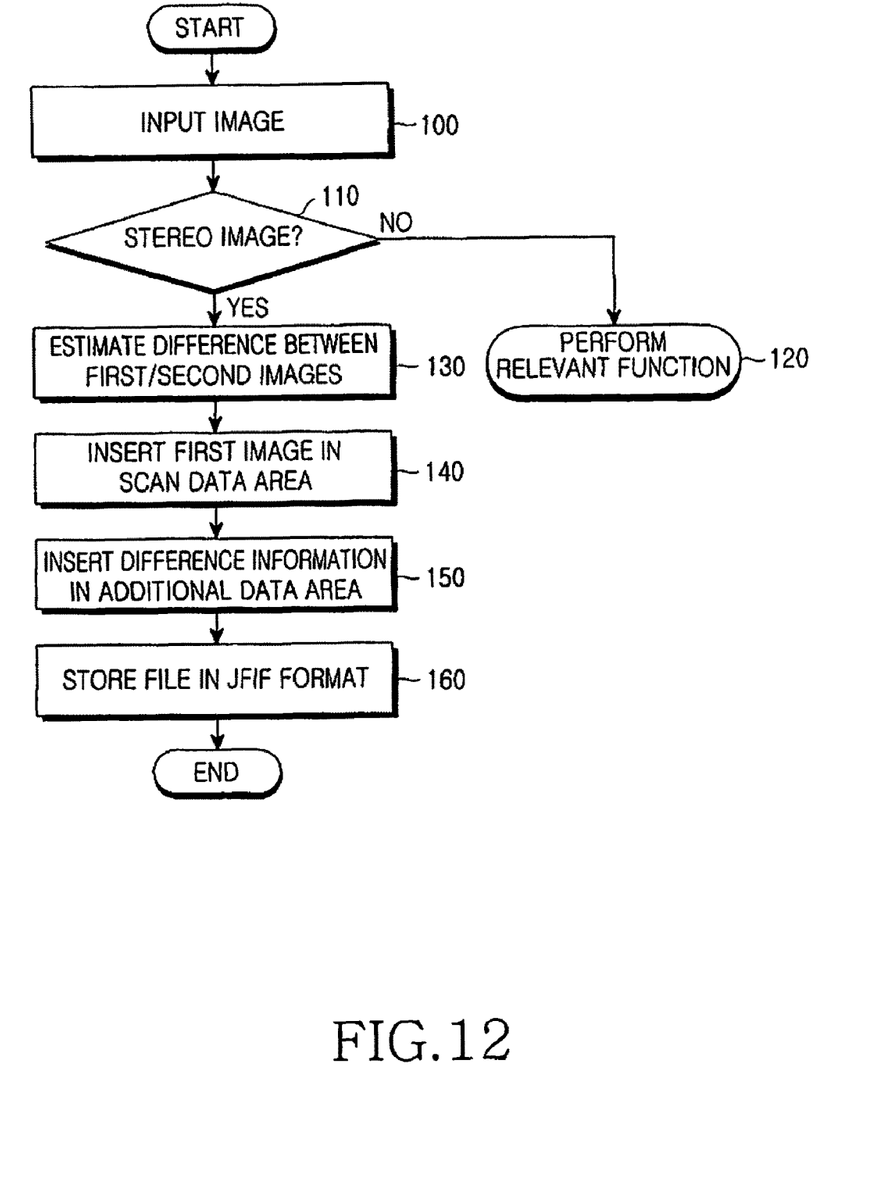
FIG. 12 is a control flowchart for storing a stereo image according to another embodiment of the present invention.

Hereinafter, a process of creating a JFIF structure according to another embodiment of the present invention will be described with reference to FIG. 12. FIG. 12 is a control flowchart for storing a stereo image according to another embodiment of the present invention.

Referring to FIG. 12, when an image is an input at step 100, an apparatus for storing a stereo image determines whether the input image 100 is a stereo image or not at step 110. When the input image 100 is not a stereo image, the apparatus proceeds to step 120 and performs a relevant function. That is, at step 120, the apparatus performs the same process as a process for storing a two-dimensional image. When the input image 100 is a stereo image, the apparatus proceeds to step 130, estimates a difference between a first image and a second image, inserts the first image in a scan data area at step 140, and inserts difference information in an additional data area from among identifier areas at step 150. Then, the apparatus for storing a stereo image stores a file as a JFIF format at step 160. In this manner, according to the present invention, a stereo image can be efficiently stored by using a JFIF format for storing a two-dimensional image.

According to the present invention, since a stereo image is stored by using a JFIF structure as described above, there is an advantage that only additional information on the stereo image is efficiently provided while lower compatibility is maintained.

While the invention has been shown and described with reference to a certain preferred embodiments thereof, it will be understood by those skilled in the art that various changes in form and details may be made therein without departing from the spirit and scope of the invention as defined by the appended claims.

What is claimed is:

1. An apparatus for storing a stereo image, the apparatus comprising:
    an image output unit for outputting a first image and a second image of one subject photographed at left/right positions spaced apart from each other by a predetermined distance;
    a JFIF structure creator for inserting the first image from the first and the second images in an image area from multiple areas included in a JPEG File Interchange Format (JFIF) file and for inserting the second image in an additional APP (APPlication) Marker area from the multiple areas, and creating a JFIF file; and
    a storing unit for storing the created JFIF file.

2. An apparatus according to claim 1, wherein the JFIF structure creator additionally inserts an area, which is used to identify a stereo image to be displayed in decoding, in the additional APP Marker area from the multiple areas.

3. An apparatus according to claim 1, wherein the second image is inserted in a thumbnail area within the additional APP Marker area.

4. An apparatus according to claim 3, wherein the second image is resized through sub-sampling before the second image is inserted in the thumbnail area.

5. An apparatus according to claim 3, wherein the second image is inserted in the thumbnail area with a size equal to that of the first image without size adjustment.

6. An apparatus according to claim 1, further comprising a difference estimator for receiving the first image and the second image from the image output unit, the difference estimator estimating a difference between the first image and the second image and outputting difference information.

7. An apparatus according to claim 6, wherein the JFIF structure creator inserts the difference information in the additional APP Marker area from the multiple areas when the difference information is transferred from the difference estimator.

8. An apparatus according to claim 1, wherein the created JFIF file comprises an APP JFIF Marker area comprising attribute information on the second image, a JFXX Marker area comprising a thumbnail area in which the second image is inserted, and an area for identifying that an image to be displayed is a stereo image.

9. A method of storing a stereo image, the method comprising the steps of:
    outputting, by an image output unit, a first image and a second image of one subject photographed at left/right positions spaced apart from each other by a predetermined distance;
    inserting, by a JFIF structure creator, the first image from the first and the second images in an image area from multiple areas included in a JPEG File Interchange Format (JFIF) file, and for inserting the second image in a thumbnail area from the multiple areas, and creating a JFIF file; and
    storing, by a storing unit, the created JFIF file.

10. The method according to claim 9, further comprising additionally inserting an area, which is used to identify a stereo image to be displayed, in an additional APP Marker area from the multiple areas.

11. The method according to claim 9, wherein the second image is resized through sub-sampling before the second image is inserted in the thumbnail area.

12. The method according to claim 9, wherein the second image is inserted in the thumbnail area with a size equal to that of the first image without size adjustment.

13. The method according to claim 9, further comprising:
    estimating a difference between the first image and the second image, thereby outputting difference information; and
    inserting the difference information in an additional APP Marker area from the multiple areas.

* * * * *